(12) United States Patent
Yang et al.

(10) Patent No.: US 10,594,920 B2
(45) Date of Patent: Mar. 17, 2020

(54) GLASS DETECTION WITH TIME OF FLIGHT SENSOR

(71) Applicant: STMicroelectronics, Inc., Coppell, TX (US)

(72) Inventors: Xiaoyong Yang, San Jose, CA (US); Darin K. Winterton, San Jose, CA (US); Arnaud Deleule, Cupertino, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 70 days.

(21) Appl. No.: 15/624,368

(22) Filed: Jun. 15, 2017

(65) Prior Publication Data

US 2017/0366737 A1  Dec. 21, 2017

Related U.S. Application Data

(60) Provisional application No. 62/350,493, filed on Jun. 15, 2016.

(51) Int. Cl.

| | |
|---|---|
| *G01S 17/48* | (2006.01) |
| *H04N 5/232* | (2006.01) |
| *G01S 17/10* | (2020.01) |
| *G01S 7/4863* | (2020.01) |
| *G01S 17/02* | (2020.01) |

(52) U.S. Cl.
CPC ....... *H04N 5/23212* (2013.01); *G01S 7/4863* (2013.01); *G01S 17/023* (2013.01); *G01S 17/10* (2013.01)

(58) Field of Classification Search
CPC ...... G01S 17/023; G01S 17/10; G01S 7/4863; H04N 5/23212

USPC ............................................ 348/208.12, 348
See application file for complete search history.

(56) References Cited

U.S. PATENT DOCUMENTS

| | | | | |
|---|---|---|---|---|
| 9,784,835 | B1 * | 10/2017 | Droz ....................... | G01S 17/08 |
| 10,067,223 | B2 * | 9/2018 | Winterton ............. | G01S 7/4861 |
| 2004/0099823 | A1 * | 5/2004 | Abraham ............... | G01B 11/06 |
| | | | | 250/559.4 |

(Continued)

FOREIGN PATENT DOCUMENTS

KR  10-2012-0043843 A  5/2012

*Primary Examiner* — James T Boylan
(74) *Attorney, Agent, or Firm* — Seed Intellectual Property Law Group LLP

(57) ABSTRACT

A device includes a time-of-flight ranging sensor configured to transmit optical pulse signals and to receive return optical pulse signals. The time-of-flight ranging sensor processes the return optical pulse signals to sense distances to a plurality of objects and to generate a confidence value indicating whether one of the plurality of objects has a highly reflective surface. The time-of-flight sensor generates a range estimation signal including a plurality of sensed distances and the confidence value. The image capture device includes autofocusing circuitry coupled to the time-of-flight sensor to receive the range estimation signal and configured to control focusing based upon the sensed distances responsive to the confidence value indicating none of the plurality of objects has a highly reflective surface. The autofocusing circuitry controls focusing independent of the sensed distances responsive to the confidence value indicating one of the objects has a highly reflective surface.

16 Claims, 11 Drawing Sheets

(56) References Cited

U.S. PATENT DOCUMENTS

| | | | | |
|---|---|---|---|---|
| 2004/0239673 | A1* | 12/2004 | Schmidt | G06T 15/60 |
| | | | | 345/426 |
| 2006/0077398 | A1* | 4/2006 | Cantin | G01B 11/25 |
| | | | | 356/512 |
| 2010/0033773 | A1* | 2/2010 | Hoshi | H04N 1/00795 |
| | | | | 358/475 |
| 2011/0293137 | A1* | 12/2011 | Gurman | G06K 9/00201 |
| | | | | 382/103 |
| 2013/0129224 | A1* | 5/2013 | Katz | G06K 9/00201 |
| | | | | 382/199 |
| 2014/0071433 | A1* | 3/2014 | Eisele | G01S 7/4816 |
| | | | | 356/5.01 |
| 2014/0320668 | A1* | 10/2014 | Kalevo | H04N 5/23212 |
| | | | | 348/169 |
| 2016/0084703 | A1* | 3/2016 | Shaber | G01T 1/2018 |
| | | | | 250/336.1 |
| 2016/0116591 | A1* | 4/2016 | Fukuman | G01S 15/931 |
| | | | | 367/124 |
| 2017/0070662 | A1* | 3/2017 | Honkanen | H04N 5/23212 |
| 2017/0098139 | A1* | 4/2017 | Protter | G06K 9/52 |
| 2018/0089848 | A1* | 3/2018 | Yang | G06T 7/55 |
| 2018/0188358 | A1* | 7/2018 | Li | G01S 7/4865 |
| 2018/0306889 | A1* | 10/2018 | Koga | G08G 1/0962 |

* cited by examiner

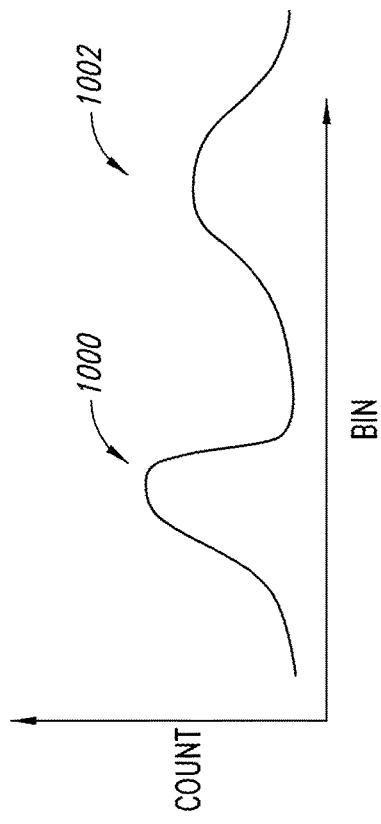
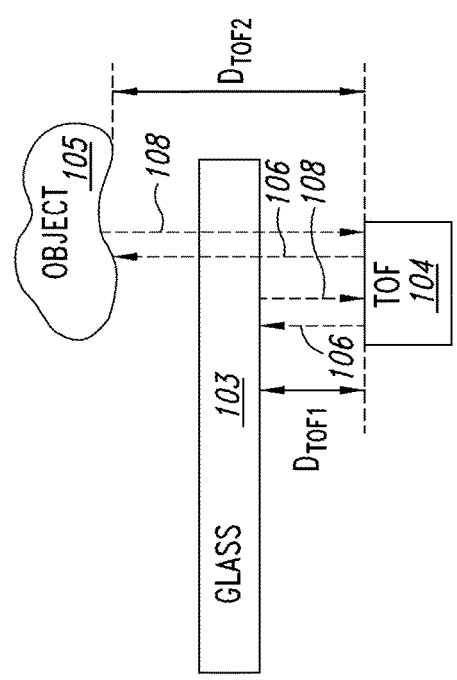
FIG. 10A
FIG. 9A
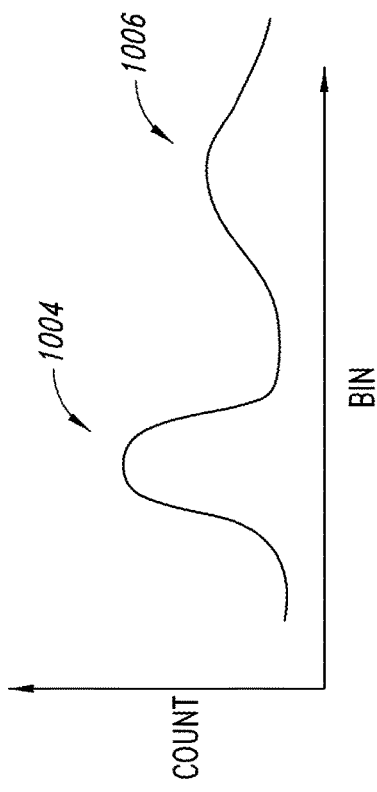
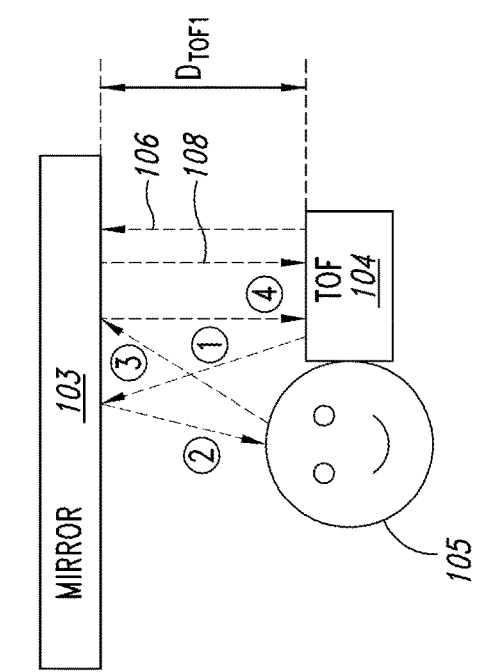
FIG. 10B
FIG. 9B

GLASS DETECTION WITH TIME OF FLIGHT SENSOR

BACKGROUND

Technical Field

The present application is directed generally to autofocusing of image capture devices, and mores specifically to incorporating a time-of-flight sensor in the image capture device to detect the presence of highly reflective surfaces like glass and a mirror and to adjust the autofocus accordingly.

Description of the Related Art

In image capture devices, such as digital cameras, include autofocusing subsystems to automatically focus the image capture device on objects being imaged. Proper focusing depends, in part, on the distance of the object being imaged from the image capture device. Many conventional image capture devices, such as those contained in electronic devices like smart phones, typically utilize passive autofocusing techniques like phase detection autofocus and contrast detection autofocus to control the autofocusing subsystem and properly focus on objects being imaged. These passive autofocusing techniques do not utilize a sensed distance between the image capture device and object being imaged. As a result, the inclusion of sensors in the image capture device for sensing this distance and then adjusting the autofocusing subsystem based on the sensed distance have been utilized in some image capture devices.

Different types of sensors have been considered for sensing a distance to an object being imaged in this situation, including infrared sensors and time-of-flight ranging sensors. With both of these types of sensors, when the object is being imaged through a transparent barrier such as clear plastic or glass, the sensor will sense the distance to the transparent barrier instead of to the object itself. The desire to capture an image of an object through a transparent barrier is a common occurrence, such as when traveling in a car or other vehicle or when taking a picture from an observation level in a tall building. To work around this problem, passive autofocusing techniques have been utilized in combination with the distance sensed by an infrared or time-of-flight ranging sensor. The passive autofocusing techniques are used to determine whether the infrared or time-of-flight ranging sensor has focused on the transparent barrier, and the autofocusing subsystem controlled to adjust the focus accordingly. While this workaround approach may work, the approach undesirably slows down the autofocusing of the image capture device.

A similar situation may arise when taking a picture of oneself in a mirror, with the time-of-flight sensor sensing the distance to the mirror, which results in improper focusing of the image capture device. There is a need for reliably sensing a distance to an object being imaged to control autofocusing even when a transparent barrier is positioned between an image capture device and the object being imaged, or when capturing an image of an object in a mirror.

BRIEF SUMMARY

In one embodiment, an image capture device includes a time-of-flight ranging sensor configured to transmit optical pulse signals and to receive return optical pulse signals. The time-of-flight ranging sensor processes the return optical pulse signals to sense distances to a plurality of objects and to generate a confidence value indicating whether one of the plurality of objects has a highly reflective surface. The time-of-flight sensor generates a range estimation signal including a plurality of sensed distances and the confidence value. The image capture device includes autofocusing circuitry coupled to the time-of-flight sensor to receive the range estimation signal and configured to control focusing based upon the sensed distances responsive to the confidence value indicating none of the plurality of objects has a highly reflective surface. The autofocusing circuitry controls focusing independent of the sensed distances responsive to the confidence value indicating one of the objects has a highly reflective surface.

BRIEF DESCRIPTION OF THE SEVERAL VIEWS OF THE DRAWINGS

FIGS. 9A and 9B illustrate situations where objects having high reflectance surfaces are sensed by the TOF ranging sensor of FIG. 1;

FIGS. 10A and 10B are graphs illustrating the operation of the TOF ranging sensor of FIG. 1 in detecting the multiple objects of FIGS. 9A and 9B;

DETAILED DESCRIPTION

The present disclosure is directed to a system that can determine if a highly reflective surface is in a target image scene for a camera. The system can adjust a flash of the system and an autofocus of the system based on the presence of the reflective surface. In addition, the system can focus on an object behind a reflective surface and adjust the flash and autofocus to image the object behind the reflective surface. Current autofocus systems typically focus on the reflective surface and do not capture the object behind the reflective surface consistently.

Figure 1:
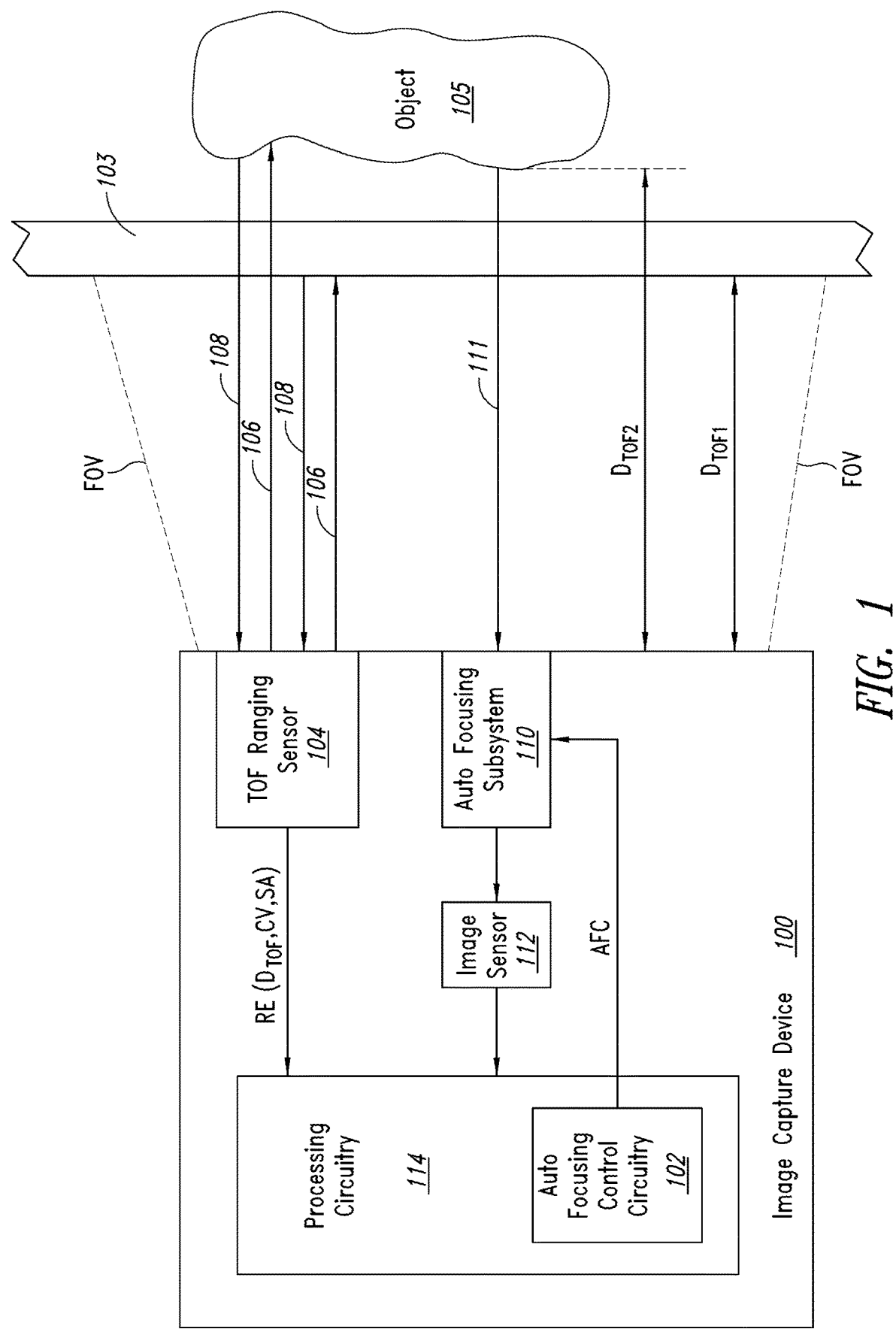
FIG. 1 is a functional block diagram of an image capture device including autofocusing control circuitry that controls focusing of the image capture device based upon whether a time-of-flight sensor senses a high reflectivity object in a field of view of the image capture device according to one embodiment of the present disclosure.

FIG. 1 is a functional block diagram of an image capture device 100 including autofocusing control circuitry 102 and a time-of-flight (TOF) ranging sensor 104 that control focusing of the image capture device based upon whether the TOF ranging sensor senses a high reflectivity object in a field of view FOV of the image capture device according to one embodiment of the present disclosure. The TOF ranging sensor 104 transmits optical pulse signals 106 that are incident upon objects in the field of view FOV. The transmitted optical pulse signals 106 reflect off objects and portions of the reflected optical pulse signals propagate back to the TOF ranging sensor 104 as return optical pulse signals 108. The TOF ranging sensor 104 processes the return optical pulse signals 108 to determine distances to the sensed objects and also to determine whether a high reflectivity surface or object, such as glass or a mirror, is one of the objects in the field of view FOV, and provides a range estimation signal RE including this determination and the sensed distances. The autofocusing control circuitry 102 then controls focusing of the image capture device 100 based on whether the range estimation signal RE indicates a high reflectivity object has been detected, as will be described in more detail below.

In the present description, certain details are set forth in conjunction with the described embodiments to provide a sufficient understanding of the present disclosure. One skilled in the art will appreciate, however, that the other embodiments may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes has not been shown or described in detail below to avoid unnecessarily obscuring the present disclosure.

In the example of FIG. 1, a first object 103 and a second object 105 are present in the field of view FOV of the image capture device 100. The first object 103 is a highly reflective surface such glass, a mirror, or other visually transparent material like transparent plastic. As used in the present description, an object or surface is considered a highly reflective surface when the surface has a high reflectance and is a relatively smooth surface. This results in an optical signal incident upon the surface reflecting off the surface as a reflected optical signal that is not significantly scattered or diffused relative to the incident optical signal. In contrast, a surface such as a wall, for example, may have a high reflectivity but be relatively rough, resulting in the reflected optical signal being diffused or scattered, as will be appreciated by those skilled in the art. The highly reflective surfaces are ones that when hit with illumination from the flash of a camera in typical camera systems generate an image that is negatively impacted by the flash on the highly reflective surface. This can include focusing on the highly reflective surface instead of the intended target or a large white or yellow array that is the flash reflecting off the surface.

In the present disclosure, the TOF ranging sensor can help the auto focus system adjust when a mirror or highly reflective surface is in the field of view. When the TOF ranging sensor 104 transmits optical pulse signals 106 that are incident upon and reflect off of the highly reflective surface 103 in FIG. 1, the TOF ranging sensor detects characteristics of these return optical pulse signals that indicate the signal have reflected off of a highly reflective surface. In this way, the TOF ranging sensor 104 can detect the presence of the highly reflective surface 103 and the autofocusing control circuitry 102 can adjust the focusing of the image capture device 100 accordingly, as will be described in more detail below.

In FIG. 1, the second object 105 is spaced from the image sensor 112 by a highly reflective surface 103. The system 100 includes the autofocusing control circuitry 102 that receives the range estimation signal RE from the TOF ranging sensor 104 and utilizes the range estimation signal to generate an autofocus control signal AFC to control the operation of an autofocusing subsystem 110 to accommodate for the highly reflective surface. The autofocusing subsystem 110 includes optical components that route and guide light 111 from the second object 105 to the image sensor 112 that captures an image of the second object 105. The autofocusing subsystem 110 can include an adjustable lens for focusing images of objects being imaged on the image sensor 112, and may also include other components such as filtering components. The image sensor 112 may be any suitable type of image sensor, such as a charge coupled device (CCD) type image sensor or a CMOS image sensor, and captures an image of the object 105 from the light provided by the autofocusing subsystem 110. The image sensor 112 provides captured images to processing circuitry 114, which controls the image sensor to capture images and would typically store the captured images and provide other image capture related processing of the captured images. Any suitable camera and autofocus system can include the features described herein.

In the embodiment of FIG. 1, the autofocusing control circuitry 102 is shown as being part of processing circuitry 114 contained in the image capture device 100. The processing circuitry 114 also includes other circuitry for controlling the overall operation of the image capture device 100. The specific structure and functionality of the processing circuitry 114 will depend on the nature of the image capture device 100. For example, the image capture device 100 may be a stand-alone digital camera or may be digital camera components contained within another type of electronic device, such as a smart phone or tablet computer. Thus, in FIG. 1 the processing circuitry 114 represents circuitry contained in the image capture device 100 but also generally represents circuitry of an electronic device, such as a smart phone or tablet computer, where the image capture device 100 is part of another electronic device. For example, where the image capture device 100 is part of a mobile device like a smart phone, the processing circuitry 114 controls the overall operation of the smart phone and also executes applications or "apps" that provide specific functionality for a user of the mobile device. The autofocusing control circuitry 102 and the TOF ranging sensor 104 may together be referred to as an autofocusing control circuit for the image capture device 100.

As illustrated in FIG. 1, the TOF ranging sensor 104 senses a first distance $D_{TOF1}$ to the highly reflective surface 103 and senses a second distance $D_{TOF2}$ to the second object 105 that is behind or on the other side of the highly reflective surface. These two distances can be detected with a single optical pulse.

The second object 105 is the object being imaged in FIG. 1, meaning a user (not shown) of the image capture device 100 wants to capture an image of the second object. With a TOF ranging sensor capable of sensing distances to multiple objects, the sensor would provide a range estimation signal RE to the autofocusing control circuitry 102 indicating the distances $D_{TOF1}$ and $D_{TOF2}$, and autofocusing control circuitry 102 would then control the autofocusing subsystem 110 to focus on the two objects 103, 105 based upon these two sensed distances. In prior systems, when the object 103 is a highly reflective surface such as glass, autofocusing control systems would control the autofocusing subsystem based upon the distance to the glass. This would image the wrong object since the desired object to be imaged is the second object 105 and not the glass 103. Conventional systems cannot determine there are two objects and that one of them is a highly reflective surface.

As mentioned above, in embodiments of the present disclosure the TOF ranging sensor 104 processes the return optical pulse signals 108 to determine whether an object in the field of view FOR is a high reflectivity surface or object, and provides the range estimation signal RE including this determination along with the sensed distances. In one embodiment, the TOF ranging sensor 104 also generates as part of the range estimation signal RE a signal amplitude SA for each of the sensed objects 103, 105. The signal amplitude SA is based on the number of photons of the return optical pulse signals 108 the TOF ranging sensor 104 receives for each of the sensed objects. The closer an object 103, 105 is to the TOF ranging sensor 104 the greater the sensed signal amplitude SA, and, conversely, the farther away the object the smaller the sensed signal amplitude.

In addition, the TOF ranging sensor 104 utilizes the signal amplitude SA detected for each of the sensed objects 103, 105 in determining whether the object is an object having a high reflectivity surface. The TOF ranging sensor 104 includes this determination in the range estimation signal RE in the form of a confidence value CV indicating whether one of the sensed objects is an object having a high reflectivity surface. The autofocusing control circuitry 102 then controls the autofocusing subsystem 110 based upon this confidence value CV, along with the sensed distances $D_{TOF}$ and signal amplitudes SA contained in the range estimation signal RE, as we described in more detail below.

Figure 2:
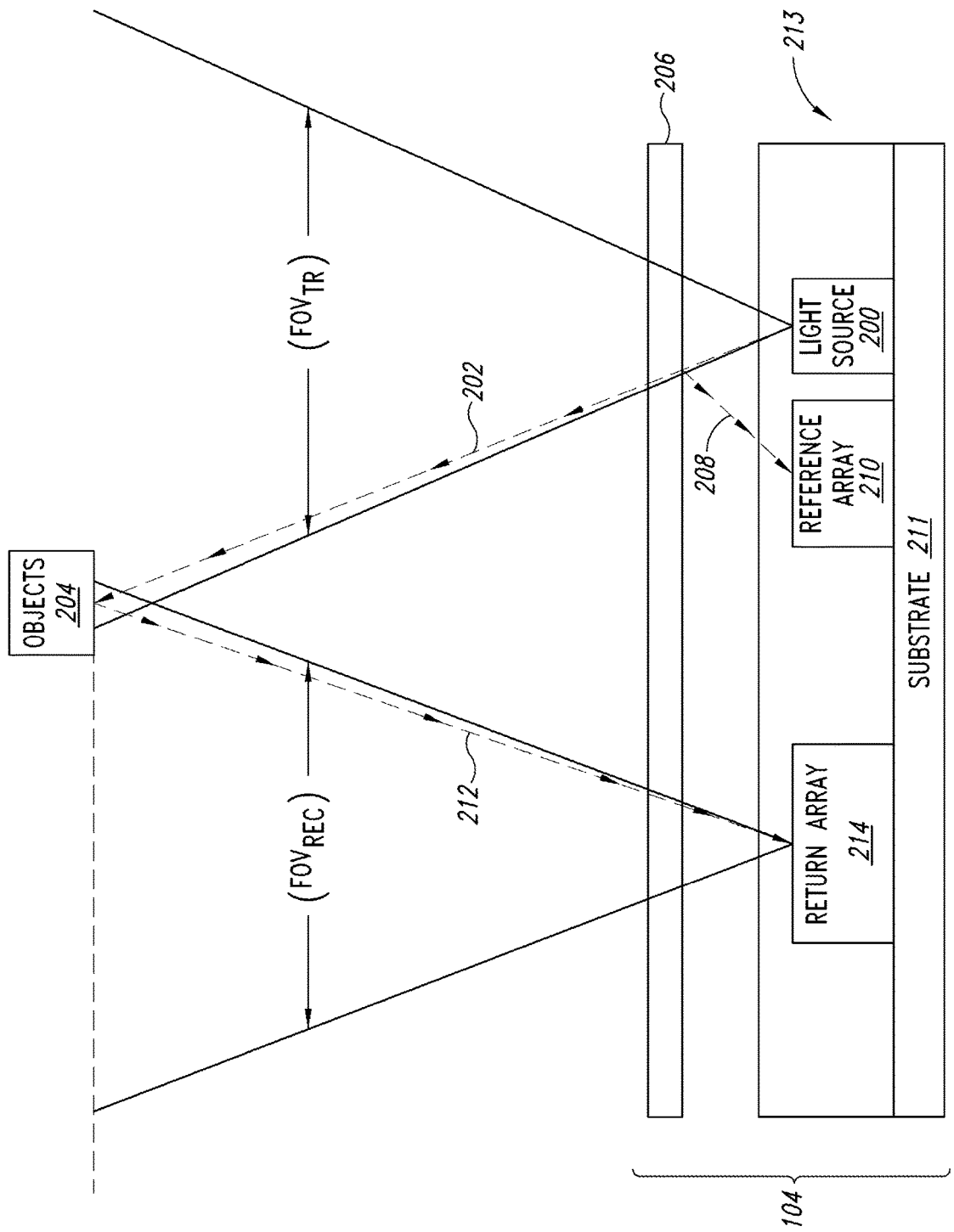
FIG. 2 is a functional diagram illustrating the operation of the TOF ranging sensor of FIG. 1.

Before describing the operation of the TOF ranging sensor 104 in generating the confidence value CV contained in the range estimation signal RE and the operation of the autofocusing control circuitry 102 based upon this confidence value, the overall structure and operation of the TOF ranging sensor will first be described in more detail with reference to FIGS. 2-7. FIG. 2 is a functional diagram illustrating components and operation of the TOF ranging sensor 104 of FIG. 1. The TOF ranging sensor 104 may be a single chip that includes a light source 200 and return and reference arrays of photodiodes 214, 210. Alternatively, these components may be incorporated within the circuitry of the image capture device 100 or other circuitry or chip within an electronic device including the image capture device. The light source 200 and the return and reference arrays 214, 210 are formed on a substrate 211. In one embodiment, all the components of the TOF ranging sensor 104 are contained within the same chip or package 213, with all components except for the light source 200 being formed in the same integrated circuit within this package in one embodiment.

The light source 200 transmits optical pulse signals having a transmission field of view $FOV_{TR}$ to irradiate objects within the field of view. A transmitted optical pulse signal 202 is illustrated in FIG. 2 as a dashed line and irradiates an object 204 within the transmission field of view $FOV_{TR}$ of the light source 200. In addition, a reflected portion 208 of the transmitted optical pulse signal 202 reflects off an integrated panel, which may be within a package 213 or may be on a cover 206 of the image capture device 100. The reflected portion 208 of the transmitted pulse is illustrated as reflecting off the cover 206, however, it may be reflected internally within the package 213.

The cover 206 may be glass, such as on a front of a mobile device associated with a touch panel or the cover may be metal or another material that forms a back cover of the electronic device. The cover will include openings to allow the transmitted and return signals to be transmitted and received through the cover if not a transparent material.

The reference array 210 of light sensors detects this reflected portion 208 to thereby sense transmission of the optical pulse signal 208. A portion of the transmitted optical pulse signal 202 reflects off objects 204 within the transmission field of view $FOV_{TR}$ as return optical pulse signals 212 that propagate back to the TOF ranging sensor 104. The TOF ranging sensor 104 includes a return array 214 of light sensors having a receiving field of view $FOV_{REC}$ that detects the return optical pulse signals 212. The field of view FOV of the image capture device 100 shown in FIG. 1 includes the transmitting and receiving fields of view $FOV_{TR}$ and $FOV_{REC}$. The TOF ranging sensor 104 then determines respective distances $D_{TOF}$ between the TOF ranging sensor and the objects 204 based upon the time between the reference array 210 sensing transmission of the optical pulse signal 202 and the return array 214 sensing the return optical pulse signal 212. The TOF ranging sensor 104 also generates a signal amplitude SA for each of the detected objects 204 and a confidence value CV indicating whether any of the sensed objects is an object having a high reflectance surface, as will be described in more detail below.

Figure 3:
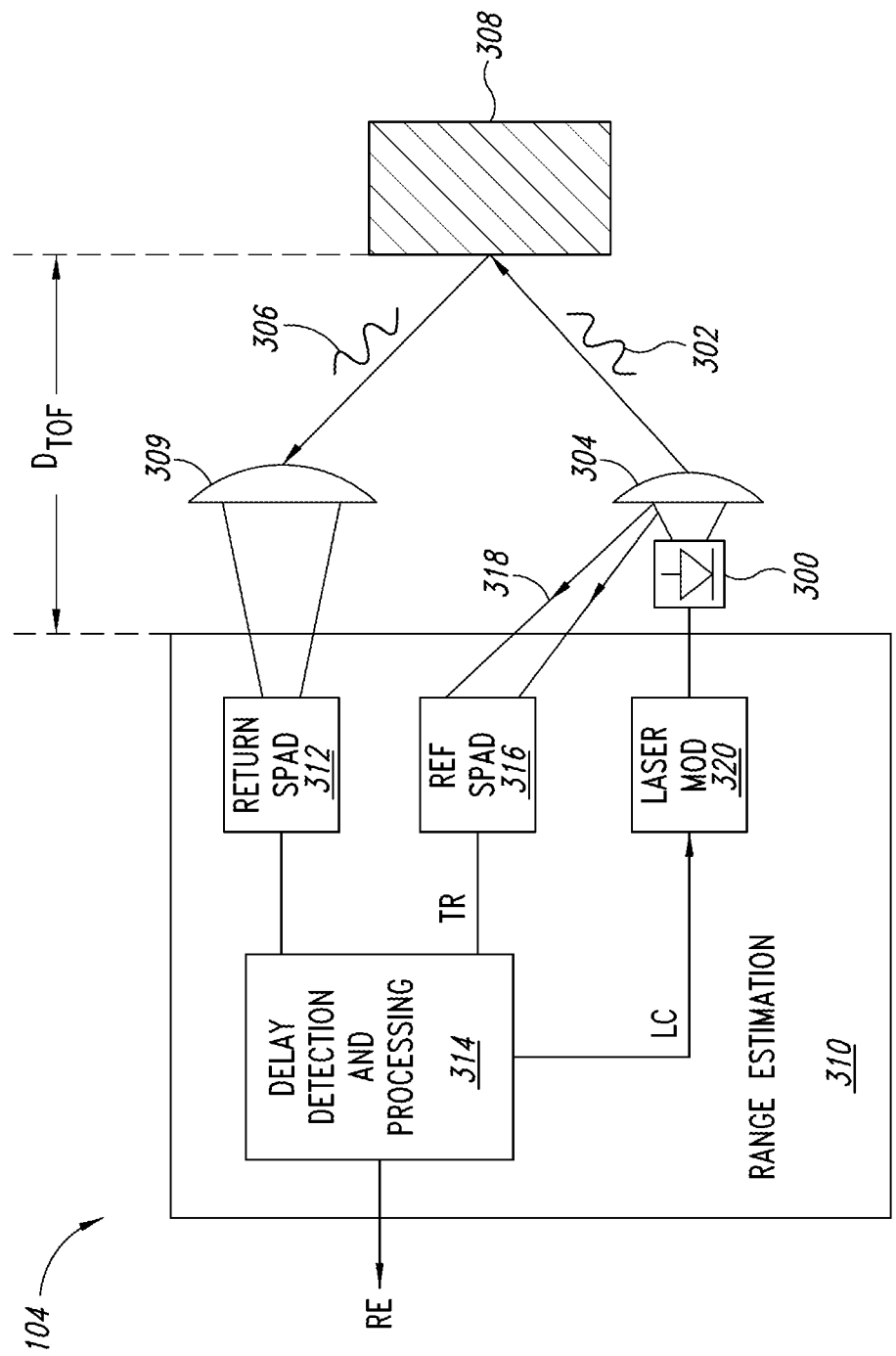
FIG. 3 is a functional block diagram illustrating in more detail one embodiment of the TOF ranging sensor of FIGS. 1 and 2.

FIG. 3 is a more detailed functional block diagram of the TOF ranging sensor 104 of FIGS. 1 and 2 according to one embodiment of the present disclosure. In the embodiment of FIG. 3, the TOF ranging sensor 104 includes a light source 300, which is, for example, a laser diode such as a vertical-cavity surface-emitting laser (VCSEL) for generating the transmitted optical pulse signal designated as 302 in FIG. 3. The transmitted optical pulse signal 302 is transmitted in the transmission field of view $FOV_{TR}$ of the light source 300 as discussed above with reference to FIG. 2. In the embodiment of FIG. 3, the transmitted optical pulse signal 302 is transmitted through a projection lens 304 to focus the transmitted optical pulse signals 302 so as to provide the desired field of view $FOV_{TR}$. The projection lens 304 can be used to control the transmitted field of view $FOV_{TR}$ of the sensor 104 and is an optional component, with some embodiments of the sensor not including the projection lens.

The reflected or return optical pulse signal is designated as 306 in FIG. 3 and corresponds to a portion of the transmitted optical pulse signal 302 that is reflected off objects within the field of view $FOV_{TR}$. One such object 308 is shown in FIG. 3. The return optical pulse signal 306 propagates back to the TOF ranging sensor 104 and is received through a return lens 309 that provides the desired return or receiving field of view $FOV_{REC}$ for the sensor 104, as described above with reference to FIG. 2. The return lens 309 in this way is used to control the field of view $FOV_{REC}$ of the sensor 104. The return lens 309 directs the return optical pulse signal 306 to range estimation circuitry 310 for generating the imaging distance $D_{TOF}$ and signal amplitude SA for each object 308. The return lens 309 is an optional component and thus some embodiments of the TOF ranging sensor 104 do not include the return lens.

In the embodiment of FIG. 3, the range estimation circuitry 310 includes a return single-photon avalanche diode (SPAD) array 312, which receives the returned optical pulse signal 306 via the lens 309. The SPAD array 312 corresponds to the return array 214 of FIG. 2 and typically includes a large number of SPAD cells (not shown), each cell including a SPAD for sensing a photon of the return optical pulse signal 306. In some embodiments of the TOF ranging sensor 104, the lens 309 directs reflected optical pulse signals 306 from separate spatial zones within the field of view $FOV_{REC}$ of the sensor to certain groups of SPAD cells or zones of SPAD cells in the return SPAD array 312, as will be described in more detail below.

Each SPAD cell in the return SPAD array 312 provides an output pulse or SPAD event when a photon in the form of the return optical pulse signal 306 is detected by that cell in the return SPAD array. A delay detection and processing circuit 314 in the range estimation circuitry 310 determines a delay time between transmission of the transmitted optical pulse signal 302 as sensed by a reference SPAD array 316 and a SPAD event detected by the return SPAD array 312. The reference SPAD array 316 is discussed in more detail below. The SPAD event detected by the return SPAD array 312 corresponds to receipt of the return optical pulse signal 306 at the return SPAD array. In this way, by detecting these SPAD events, the delay detection and processing circuit 314 estimates an arrival time of the return optical pulse signal 306. The delay detection and processing circuit 314 then determines the time of flight TOF based upon the difference between the transmission time of the transmitted optical pulse signal 302 as sensed by the reference SPAD array 316 and the arrival time of the return optical pulse signal 306 as sensed by the SPAD array 312. From the determined time of flight TOF, the delay detection and processing circuit 314 generates the range estimation signal RE (FIG. 1) indicating the detected distance $D_{TOF}$ between the object 308 and the TOF ranging sensor 104.

The reference SPAD array 316 senses the transmission of the transmitted optical pulse signal 302 generated by the light source 300 and generates a transmission signal TR indicating detection of transmission of the transmitted optical pulse signal. The reference SPAD array 316 receives an internal reflection 318 from the lens 304 of a portion of the transmitted optical pulse signal 302 upon transmission of the transmitted optical pulse signal from the light source 300, as discussed for the reference array 210 of FIG. 2. The lenses 304 and 309 in the embodiment of FIG. 3 may be considered to be part of the glass cover 206 or may be internal to the package 213 of FIG. 2. The reference SPAD array 316 effectively receives the internal reflection 318 of the transmitted optical pulse signal 302 at the same time the transmitted optical pulse signal is transmitted. In response to this received internal reflection 318, the reference SPAD array 316 generates a corresponding SPAD event and in response thereto generates the transmission signal TR indicating transmission of the transmitted optical pulse signal 302.

The delay detection and processing circuit 314 includes suitable circuitry, such as time-to-digital converters or time-to-analog converters, to determine the time-of-flight TOF between the transmission of the transmitted optical pulse signal 302 and receipt of the reflected or return optical pulse signal 308. The delay detection circuit 314 then utilizes this determined time-of-flight TOF to determine the distance $D_{TOF}$ between the hand 308 and the TOF ranging sensor 104. The range estimation circuitry 310 further includes a laser modulation circuit 320 that drives the light source 300. The delay detection and processing circuit 314 generates a laser control signal LC that is applied to the laser modulation circuit 320 to control activation of the laser 300 and thereby control transmission of the transmitted optical pulse signal 302. The range estimation circuitry 310, or more specifically the delay detection and processing circuit 314 contained therein, also determines the signal amplitude SA for each sensed object based upon the SPAD events detected by the return SPAD array 312 for that object. The signal amplitude SA is based on the number of photons of the return optical pulse signal 306 received by the return SPAD array 312. The closer the object 308 is to the TOF ranging sensor 104 the greater the sensed signal amplitude SA, and, conversely, the farther away the object the smaller the sensed signal amplitude. In addition, the TOF ranging sensor 104 also utilizes these detected SPAD events and corresponding signal amplitude SA for each object in determining whether the sensed object is a high reflectivity surface, as will be described in more detail below.

Figure 4A:
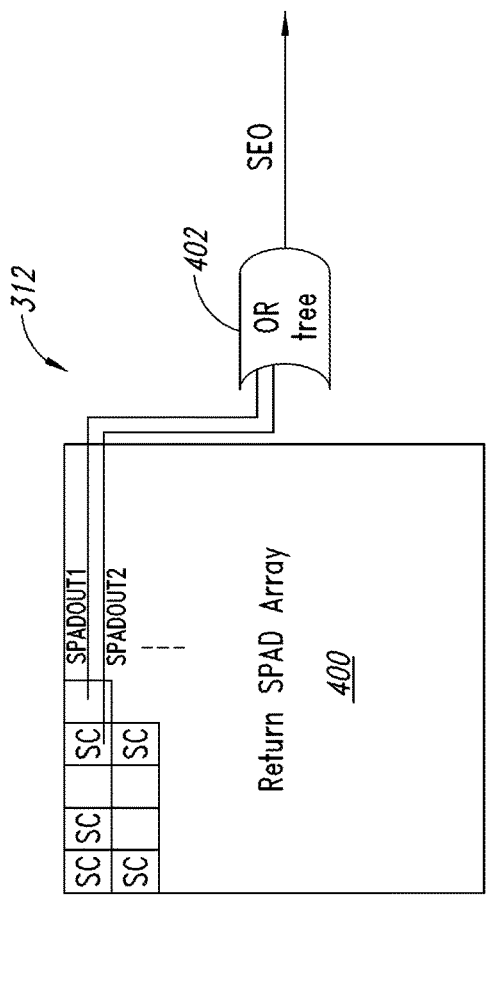
FIG. 4A is a functional diagram of a single zone embodiment of the return single photon avalanche diode (SPAD) array contained in the TOF ranging sensor of FIG. 3.

FIG. 4A is a functional diagram of a single zone embodiment of the return SPAD array 312 of FIG. 3. In this embodiment, the return SPAD array 312 includes a SPAD array 400 including a plurality of SPAD cells SC, some of which are illustrated and labeled in the upper left portion of the SPAD array. Each of these SPAD cells SC has an output, with two outputs labeled SPADOUT1, SPADOUT2 shown for two SPAD cells by way of example in the figure. The output of each SPAD cell SC is coupled to a corresponding input of an OR tree circuit 402. In operation, when any of the SPAD cells SC receives a photon from the reflected optical pulse signal 306, the SPAD cell provides an active pulse on its output. Thus, for example, if the SPAD cell SC having the output designated SPADOUT2 in the figure receives a photon from the reflected optical pulse signal 306, then that SPAD cell will pulse the output SPADOUT2 active. In response to the active pulse on the SPADOUT2, the OR tree circuit 402 will provide an active SPAD event output signal SEO on its output. Thus, whenever any of the SPAD cells SC in the return SPAD array 400 detects a photon, the OR tree circuit 402 provides an active SEO signal on its output. In the single zone embodiment of FIG. 4A, the TOF ranging sensor 104 may not include the lens 309 and the return SPAD array 312 corresponds to the return SPAD array 400 and detects photons from reflected optical pulse signals 306 within the single field of view $FOV_{REC}$ (FIG. 2) of the sensor. In the single zone return SPAD array 400 embodiment of FIG. 4A, the TOF ranging sensor 104 need not include the return lens 309 of FIG. 3. In order to get a more accurate estimate of the reflectance of an object in the infrared spectrum, an object is assumed to cover the full field of view of the sensor. In the multiple zone embodiments, the different zones of the return SPAD array effectively have separate, smaller fields of view as discussed with below reference to FIGS. 4B and 7. In these embodiments, there is more confidence of smaller objects at distances $D_{TOF}$ covering the entire field of view of a given zone.

Figure 4B:
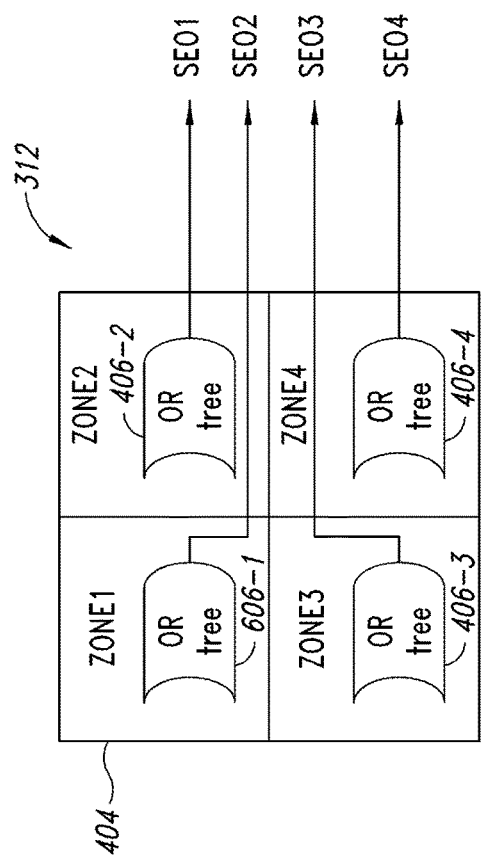
FIG. 4B is a functional diagram of a multi zone embodiment of the return SPAD array contained in the TOF ranging sensor of FIG. 3.

FIG. 4B is a functional diagram of a multiple zone embodiment of the return SPAD array 312 FIG. 3. In this embodiment, the return SPAD array 312 includes a return SPAD array 404 having four array zones ZONE1-ZONE4, each array zone including a plurality of SPAD cells. Four zones ZONE1-ZONE4 are shown by way of example and the SPAD array 404 may include more or fewer zones, such as nine (9) zones or sixteen (16) zones. A zone in the SPAD array 404 is a group or portion of the SPAD cells SC contained in the entire SPAD array. The SPAD cells SC in each zone ZONE1-ZONE4 have their output coupled to a corresponding OR tree circuit 406-1 to 406-4. The SPAD cells SC and outputs of these cells coupled to the corresponding OR tree circuit 406-1 to 406-4 are not shown in FIG. 4B to simplify the figure.

In this embodiment, each of zones ZONE1-ZONE4 of the return SPAD array 404 effectively has a smaller subfield of view corresponding to a portion of the overall field of view $FOV_{REC}$ (FIG. 2). The return lens 309 of FIG. 3 directs return optical pulse signals 306 from the corresponding spatial zones or subfields of view within the overall field of view $FOV_{REC}$ to corresponding zones ZONE1-ZONE4 of the return SPAD array 404. In operation, when any of the SPAD cells SC in a given zone ZONE1-ZONE4 receives a photon from the reflected optical pulse signal 306, the SPAD cell provides an active pulse on its output that is supplied to the corresponding OR tree circuit 406-1 to 406-4. Thus, for example, when one of the SPAD cells SC in the zone ZONE1 detects a photon that SPAD cell provides and active pulse on its output and the OR tree circuit 406-1, in turn, provides an active SPAD event output signal SEO1 on its output. In this way, each of the zones ZONE1-ZONE4 operates independently to detect SPAD events (i.e., receive photons from reflected optical pulse signals 306 in FIG. 3).

Figure 5A:
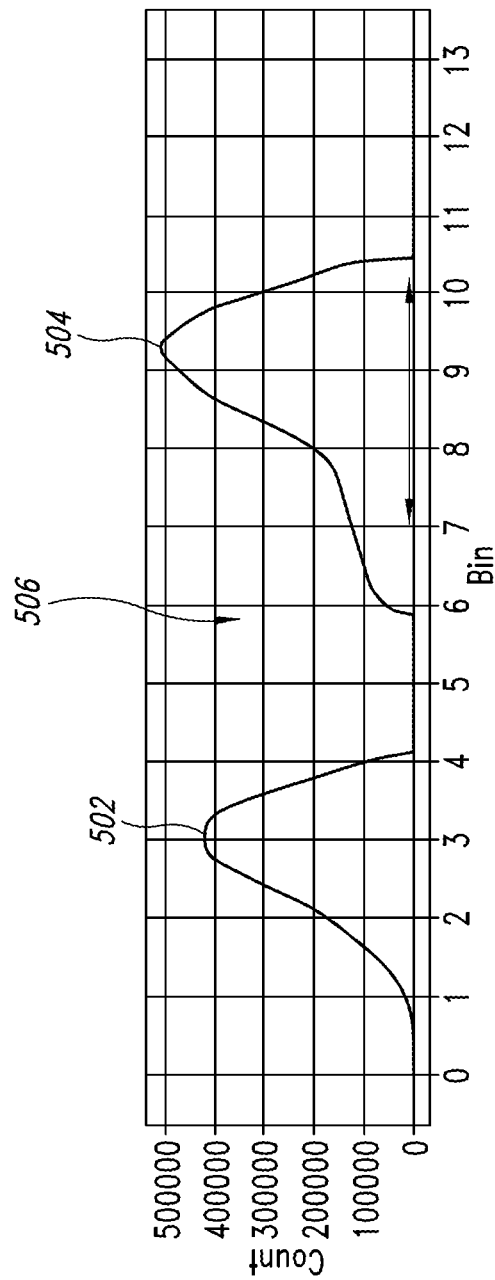
FIGS. 5A and 5B are graphs illustrating operation of the TOF ranging sensor of FIG. 3 in detecting multiple objects within a field of view of the sensor.
Figure 5B:
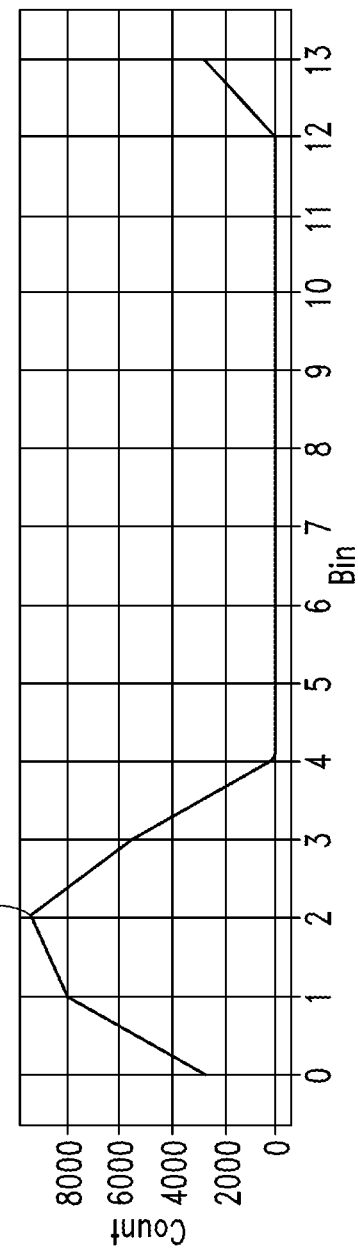

FIGS. 5A and 5B are graphs illustrating operation of the TOF ranging sensor 104 of FIG. 2 in detecting multiple objects within the field of view FOV of the TOF ranging sensor 104 of FIGS. 2 and 3. The graphs of FIGS. 5A and 5B are signal diagrams showing a number of counts along a vertical axis and time bins along a horizontal axis. The number of counts indicates a number of SPAD events that have been detected in each bin, as will be described in more detail below. These figures illustrate operation of a histogram based ranging technique implemented by the TOF ranging sensor 104 of FIGS. 1-3 according to an embodiment of the present disclosure. This histogram based ranging technique allows the TOF ranging sensor 104 to sense or detect multiple objects within the field of view FOV of the TOF ranging sensor.

Figure 6:
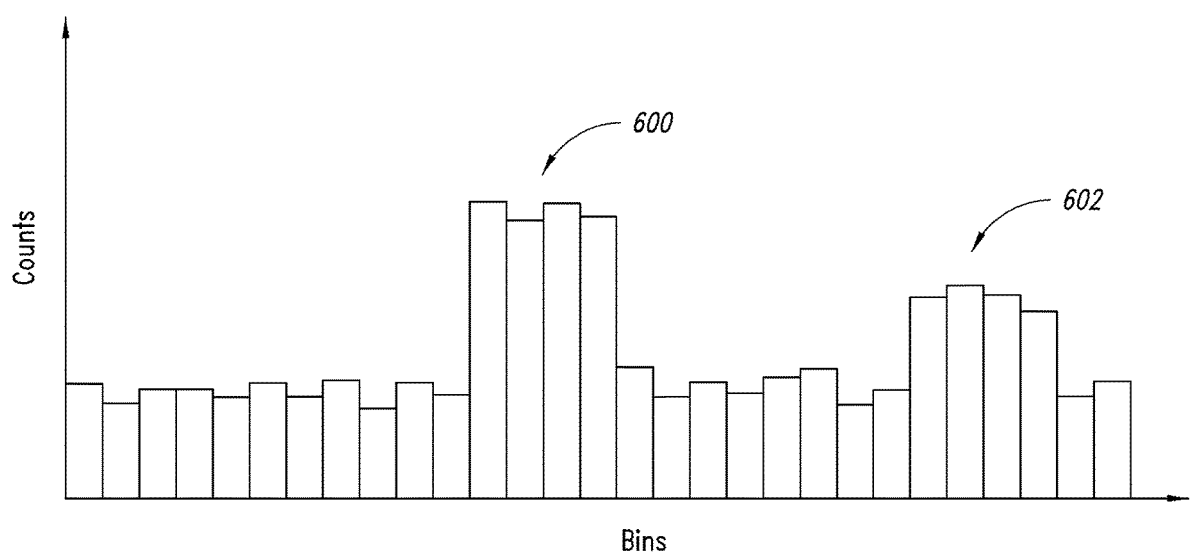
FIG. 6 is a histogram generated by the TOF ranging sensor in the embodiment of FIGS. 5A and 5B which provides detected distance information for multiple objects within the field of view of the sensor.

This histogram based ranging technique is now described in more detail with reference to FIGS. 3, 4A, 4B, 5A and 5B. In this technique, more than one SPAD event is detected each cycle of operation, where the transmitted optical pulse signal 302 is transmitted each cycle. SPAD events are detected by the return SPAD array 312 (i.e., return SPAD array 400 or 404 of FIGS. 4A, 4B) and reference SPAD array 316, where a SPAD event is an output pulse provided by the return SPAD array indicating detection of a photon. Thus, an output pulse from the OR tree circuit 402 of FIG. 4A or one of the OR tree circuits 406-1 to 406-4 of FIG. 4B. Each cell in the SPAD arrays 312 and 3216 will provide an output pulse or SPAD event when a photon is received in the form of the return optical pulse signal 306 for target SPAD array 212 and internal reflection 318 of the transmitted optical pulse signal 302 for the reference SPAD array 316. By monitoring these SPAD events an arrival time of the optical signal 306, 318 that generated the pulse can be determined. Each detected SPAD event during each cycle is allocated to a particular bin, where a bin is a time period in which the SPAD event was detected. Thus, each cycle is divided into a plurality of bins and a SPAD event detected or not for each bin during each cycle. Detected SPAD events are summed for each bin over multiple cycles to thereby form a histogram in time as shown in FIG. 6 for the received or detected SPAD events. The delay detection circuit 314 of FIG. 3 or other control circuitry in the TOF ranging sensor 104 implements this histogram-based technique in one embodiment of the sensor.

FIGS. 5A and 5B illustrate this concept over a cycle. Multiple cells in each of the SPAD arrays 312 and 316 may detect SPAD events in each bin, with the count of each bin indicating the number of such SPAD events detected in each bin over a cycle. FIG. 5B illustrates this concept for the internal reflection 318 of the transmitted optical pulse signal 302 as detected by the reference SPAD array 316. The sensed counts (i.e., detected number of SPAD events) for each of the bins shows a peak 500 at about bin 2 with this peak being indicative of the transmitted optical pulse signal 302 being transmitted. FIG. 5A illustrates this concept for the reflected or return optical pulse signal 306, with there being two peaks 502 and 504 at approximately bins 3 and 9. These two peaks 502 and 504 (i.e., detected number of SPAD events) indicate the occurrence of a relatively large number of SPAD events in the bins 3 and 9, which indicates reflected optical pulse signals 306 reflecting off a first object causing the peak at bin 3 and reflected optical pulse signals 306 reflecting off a second object at a greater distance than the first object causing the peak at bin 9. A valley 506 formed by a lower number of counts between the two peaks 502 and 504 indicates no additional detected objects between the first and second objects. Thus, the TOF ranging sensor 104 is detecting two objects, such as the objects 103 and 105 of FIG. 1, within the FOV of the sensor in the example of FIGS. 7A and 7B. The two peaks 502 and 504 in FIG. 5A are shifted to the right relative to the peak 500 of FIG. 5B due to the time-of-flight of the transmitted optical pulse signal 302 in propagating from the TOF ranging sensor 104 to the two objects 103, 105 within the FOV but at different distances from the TOF ranging sensor.

FIG. 6 illustrates a histogram generated by TOF ranging sensor 104 over multiple cycles. The height of the rectangles for each of the bins along the horizontal axis represents the count indicating the number of SPAD events that have been detected for that particular bin over multiple cycles of the TOF ranging sensor 104. As seen in the histogram of FIG. 6, two peaks 600 and 602 are again present, corresponding to the two peaks 602 and 604 in the single cycle illustrated in FIG. 5A. From the histogram of FIG. 6, the TOF ranging sensor 104 determines a distance $D_{TOF}$ to each of the first and second objects 103, 105 in the FOV of the TOF ranging sensor. In addition, the TOF ranging sensor 104 also generates the signal amplitude SA for each of the objects 103, 105 based upon these counts, namely the number of photons or SPAD events generated by the return SPAD array 312 in response to the return optical pulse signal 306. The TOF ranging sensor 104 also generates the confidence value CV indicating whether the first or second object 103, 105 is an object having a high reflectivity surface, as will be described in more below.

Figure 7:
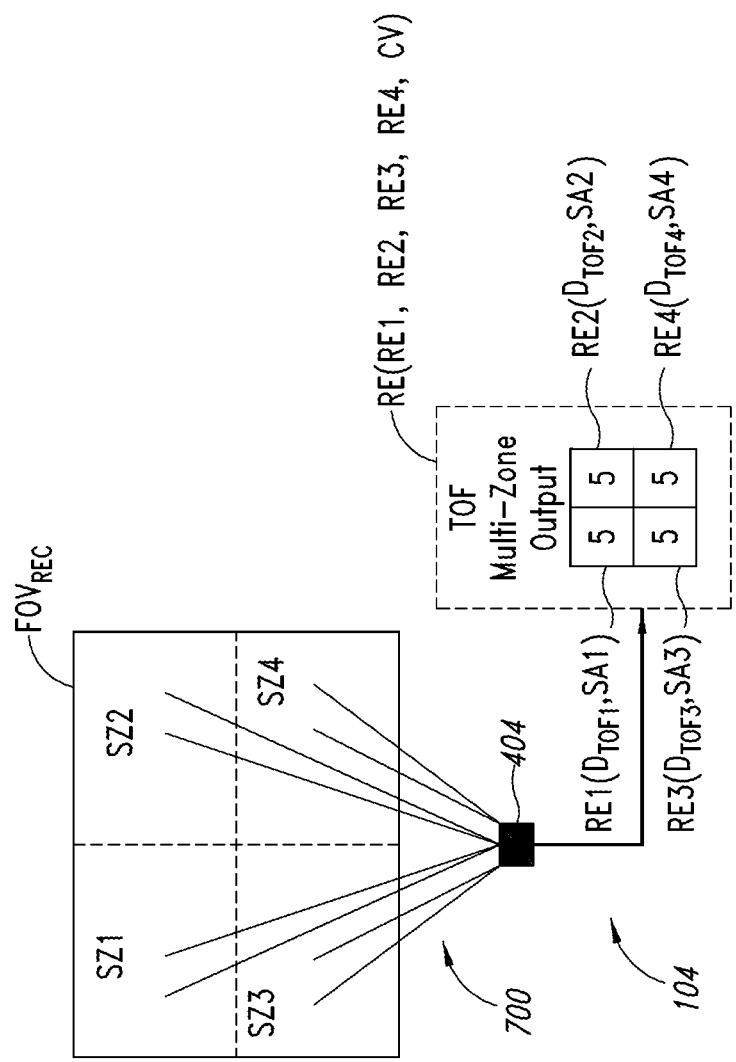
FIG. 7 is a diagram illustrating multiple spatial zones where the TOF ranging sensor of FIG. 3 is a multiple zone sensor.

FIG. 7 is a diagram illustrating multiple spatial zones within the receiving field of view $FOV_{REC}$ where the TOF ranging sensor 104 is a multiple zone sensor including the return SPAD array 404 of FIG. 4B. In this embodiment, the receiving field of view $FOV_{REC}$ includes four spatial zones SZ1-SZ4 as shown. Thus, the four spatial zones SZ1-SZ4 collectively form the receiving field of view $FOV_{REC}$ of the TOF ranging sensor 104. The transmitted optical pulse signal 302 (FIG. 3) illuminates these four spatial zones SZ1-SZ4 within the receiving field of view $FOV_{REC}$. The number of spatial zones SZ corresponds to the number of array zones ZONE1-ZONE4 in the return SPAD array 404 of FIG. 4B.

Where the return SPAD array 404 includes a different number of array zones ZONE1-ZONE4 or a different arrangement of the array zones within the return SPAD array, then the number and arrangement of the corresponding spatial zones SZ within the overall field of view $FOV_{REC}$ will likewise vary. In such a multiple zone TOF ranging sensor 104 as functionally illustrated in FIG. 7, the return lens 309 (FIG. 3) is configured to route return optical pulse signals 306 from each of the spatial zones SZ within the overall field of view $FOV_{REC}$ to a corresponding array zone ZONE1-ZONE4 of the return SPAD array 404 of FIG. 4B. This is represented in the figure through the pairs of lines 700 shown extending from the return SPAD array 404 to each of the spatial zones SZ1-SZ4.

Each of the array zones ZONE1-ZONE4 outputs respective SPAD event output signals SEO1-SEO4 as previously described with reference to FIG. 4B, and the TOF ranging sensor 104 accordingly calculates four different imaging distances $D_{TOF1}$-$D_{TOF4}$, one for each of the spatial zones SZ1-SZ4. Thus, in this embodiment the range estimation signal RE generated by the TOF ranging sensor 104 includes four different values for the four different detected imaging distances $D_{TOF1}$-$D_{TOF4}$. Each of these detected imaging distances $D_{TOF1}$-$D_{TOF4}$ is shown as being part of the generated range estimation signal RE to have a value 5. This would indicate objects in each of the spatial zones SZ1-SZ4 are the same distance away, or there is one object covering all the spatial zones. The value 5 was arbitrarily selected merely to represent the value of each of the detected imaging distances $D_{TOF1}$-$D_{TOF4}$ and to illustrate that in the example of FIG. 7 each of these detected imaging distances has the same value.

As seen in FIG. 7, the TOF ranging sensor 104 also outputs the signal amplitude SA signal for each of the spatial zones SZ and corresponding array zones ZONE. Thus, for the spatial zone SZ1 the TOF ranging sensor 104 generates the range estimation signal RE1 including the sensed distance $D_{TOF1}$ and signal amplitude SA1 generated based on SPAD events detected by array zone ZONE1. The signals RE2-RE4 for spatial zones SZ2-SZ4 and array zones ZONE2-ZONE4 are also shown.

As shown in FIG. 7, the overall range estimation signal RE generated by the TOF ranging sensor 104 also includes, in addition to the signals RE1-RE4, the confidence value CV indicating whether an object sensed by any of the array zones ZONE1-ZONE4 is an object having a high reflectivity surface. This confidence value CV is then used by the autofocusing control circuitry 102 in generating the autofocus control signal AFC to control the focus of the autofocusing subsystem 110, as will now be described in more detail.

Figure 8:
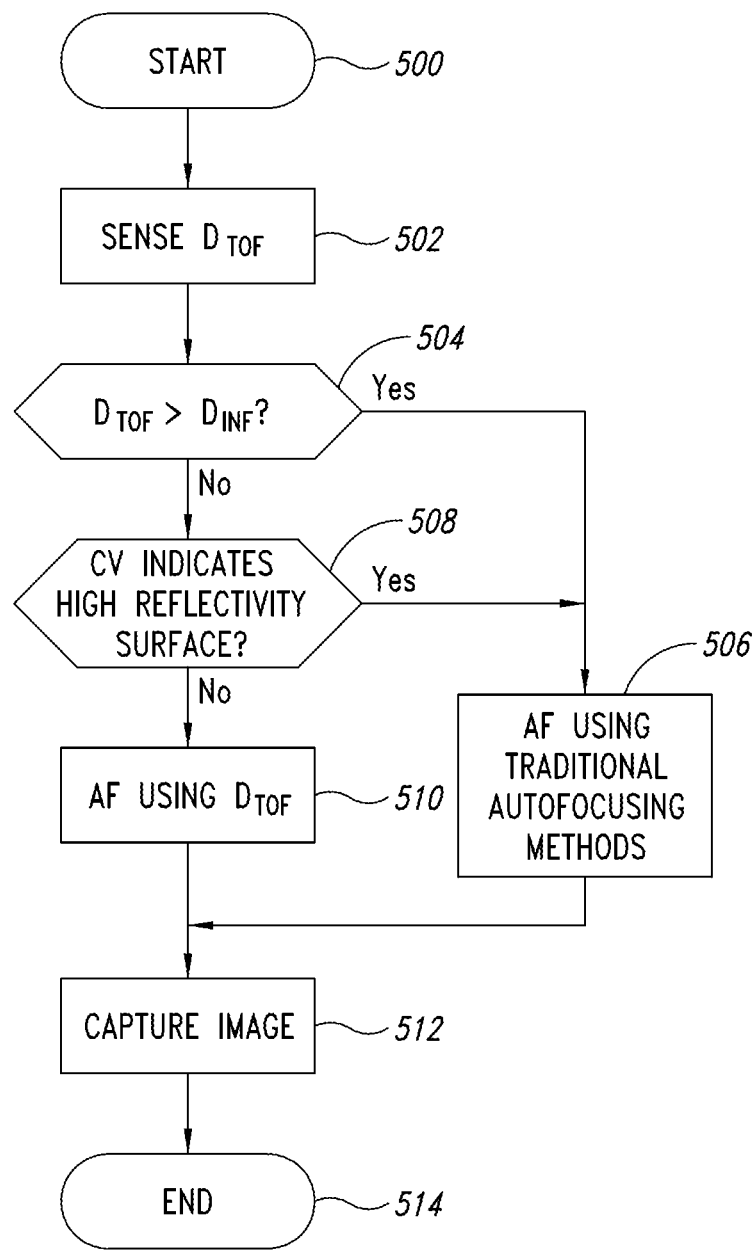
FIG. 8 is a flowchart illustrating an autofocusing control process executed by the autofocusing control circuitry of FIG. 1 according to one embodiment of the present disclosure.

FIG. 8 is a flowchart illustrating an autofocusing control process executed by the autofocusing control circuitry 102 of FIG. 1 according to one embodiment of the present disclosure. Referring to FIG. 8 and FIG. 1, the process begins in step 500 and proceeds to step 502 in which the TOF ranging sensor 104 senses the distance or distances $D_{TOF}$ to an object or objects within the field of view FOV of the image capture device 100. In step 502 the autofocusing control circuitry 102 determines whether the sensed distance or distances $D_{TOF}$ in the range estimation signal RE are greater than an infinity threshold distance $D_{TOF}$.

The infinity threshold distance $D_{TOF}$ represents a maximum distance beyond which the TOF ranging sensor 104 cannot reliably sense distance. Thus, step 504 determines whether the TOF ranging sensor 104 has sensed any objects proximate the image capture device 100 for which corresponding sensed distances $D_{TOF}$ may be utilized by the autofocusing control circuitry 102 to control focusing of the image capture device 100. If the determination in step 504 is positive, indicating the TOF ranging sensor 104 has sensed no objects within the infinity threshold distance $D_{TOF}$ from the image capture device 100, the process then proceeds to step 506 and the autofocusing control circuitry 102 utilizes other autofocusing techniques to generate the autofocusing control signal AFC to control the autofocusing subsystem 110 to focus on objects within the field of view FOV of the image capture device 100. For example, the autofocusing control circuitry 102 could utilize phase detection autofocus or contrast detection autofocus to control the autofocusing subsystem 110 to focus the image capture device on objects within the field of view FOV. Other autofocusing techniques may of course be utilized by the autofocusing control circuitry 102 in this situation.

In addition, in another embodiment the TOF ranging sensor 104 may generate the range estimation signal RE including a field or indicator indicating that the sensor has detected no objects proximate the image capture device within the infinity threshold distance $D_{TOF}$. In this situation, the autofocusing control circuitry 102 would check the state of this field or indicator in the range estimation signal RE and then proceed to step 506 when the field indicates the TOF ranging sensor has detected no proximate objects.

When the determination in step 504 is negative, this indicates the TOF ranging sensor 104 has sensed a distance $D_{TOF}$ to at least one object that is within the infinity threshold distance $D_{TOF}$ of the image capture device 100. In this situation, the process proceeds to step 508 and the autofocusing control circuitry 102 determines whether the confidence value CV contained in the range estimation signal RE indicates the TOF ranging sensor 104 has detected an object having a high reflectance surface. If the confidence value CV indicates such a high reflectance surface has been detected, the process proceeds once again to step 506 and the autofocusing control circuitry 102 utilizes other autofocusing techniques to generate the autofocusing control signal AFC to control the autofocusing subsystem 110 to focus on objects within the field of view FOV of the image capture device 100.

In this way, the autofocusing control circuitry 102 utilizes the confidence value CV contained in the range estimation signal RE to determine that the range estimation signal should not be utilized to control the autofocusing subsystem 110 because of the presence of an object having a high reflectance surface. This prevents the autofocusing control circuitry 102 from erroneously controlling the autofocusing subsystem 110 to focus on such a high reflectance surface. For example, as previously mentioned with reference to FIG. 1, where the object 103 is glass, the sensed distance to this class contained in the range estimation signal RE generated by the TOF ranging sensor 104 should not be utilized by the autofocusing control circuitry 102 to control the autofocusing subsystem 110. Thus, when the confidence value CV indicates the TOF ranging sensor 104 has detected an object having a high reflectance surface, the autofocusing control circuitry utilizes conventional autofocusing techniques to focus the image capture device 100.

When the determination in step 508 is negative, indicating the TOF ranging sensor 104 has detected no objects having a high reflectance surfaces, the process proceeds to step 510 and the autofocusing control circuitry 102 generates the autofocus control signal AFC to control the autofocusing subsystem 110 to focus on the sensed object or object based on the sensed distance or distances $D_{TOF}$ contained in the range estimation signal RE. The autofocusing control circuitry 102 may also generate the autofocus control signal AFC based upon the signal amplitudes SA for the detected objects contained in the range estimation signal RE. Once the autofocusing control circuitry 102 has generated the autofocusing control signal AFC to focus the autofocusing subsystem 110, the process proceeds to step 512 and the autofocusing control circuitry or processing circuitry 114 controls the image sensor 112 to capture an image of the object or objects being imaged. The system can adjust an intensity of the flash and can adjust the autofocus to illuminate and focus on the object to be imaged, which may or may not be the highly reflective surface. The processing circuitry 114 or autofocusing control circuitry 102 and typically stores the captured image. From step 512 the process proceeds to step 514 and terminates.

FIGS. 9A and 9B illustrate situations where objects having high reflectance surfaces are sensed by the TOF ranging sensor 104. FIGS. 10A and 10B are graphs illustrating the operation of the TOF ranging sensor 104 in detecting the multiple objects of FIGS. 9A and 9B, respectively. FIG. 9A illustrates the situation of FIG. 1 where the TOF ranging sensor 104 is positioned a distance $D_{TOF1}$ from glass 103 and a user of the image capture device 100 including the TOF ranging sensor wishes to capture an image of the object 105 on the other side of the glass. In this situation, the TOF ranging sensor 104 transmits optical signals 106 and receives return optical signals 108 from the first and second objects 103, 105 as shown. A portion of transmitted optical pulse signals 106 reflect off the glass 103 and a portion propagate through the glass and then reflect off the object 105 as shown. From the return optical pulse signals 108, the TOF ranging sensor 104 generates the SPAD event or count graph of FIG. 10A including a first peak 1000 in bins that correspond to the first sensed distance $D_{TOF1}$ and a second peak 1002 in bins that correspond to the second sensed distance $D_{TOF2}$.

As previously discussed, the TOF ranging sensor 104 also generates a signal amplitude SA for each of the first and second sensed objects 103, 105. This signal amplitude SA is related to the counts and where the sensed object is a highly reflective object, such as the glass 103 in FIG. 9A, the signal amplitude for this object will be relatively large. As will be discussed in more detail with reference to FIG. 11 below, such a smooth highly reflective surface results in a large count and thus a large signal amplitude SA since most of the transmitted optical pulse signals 106 reflect off the glass 103 as return optical pulse signals 108 that are received by the return SPAD array 312 (FIG. 3) of the TOF ranging sensor 104.

In this situation, the delay detection and processing circuit 314 (FIG. 3) of the TOF ranging sensor 104 utilizes this sensed information including the distances $D_{TOF1}$ and $D_{TOF2}$ and signal amplitudes SA of the object 103 and object 105 to determine that the object 103, which is glass in the example of FIG. 9A, is an object having a high reflectance surface. More specifically, where the TOF ranging sensor 104 senses a first object 103 at a first distance $D_{TOF1}$ and a second object at a second distance $D_{TOF2}$ that is greater than the first distance, and the first object has a large sensed signal amplitude SA, the delay detection and processing circuit 314 (FIG. 3) determines that the sensed object 103 is an object having a high reflectance surface such as glass. The delay detection and processing circuit 314 then sets the confidence value CV in the range estimation signal RE to indicate detection of such a high reflectance surface. In this situation, as previously described with reference to FIG. 8, the autofocusing control circuitry 102 may then focus the image capture device 100 based on conventional autofocusing techniques. Alternatively, the autofocusing control circuitry 102 could focus the image capture device 100 based upon the sensed distance $D_{TOF2}$ to the second object 105.

FIG. 9B illustrates the situation where the TOF ranging sensor 104 is positioned a distance $D_{TOF1}$ from a mirror 103 and a user of the image capture device 100 including the TOF ranging sensor wishes to capture an image of the object 105 reflected in the mirror, which is illustrated in the figure as corresponding to the user. In this situation, the TOF ranging sensor 104 transmits optical signals 106 and receives return optical signals 108 that represent the first object 103 (the surface of the mirror) and the reflection of the second object 105 as shown.

A portion of transmitted optical pulse signals 106 reflect off the mirror 103 and directly back to the TOF ranging sensor 104 while a portion reflect off the mirror and propagate back and reflect off the user 105, and then reflect off the user back to the mirror and then back to the TOF ranging sensor 104. This is shown through the lines 1-4, respectively, in FIG. 9B. From the return optical pulse signals 108, the TOF ranging sensor 104 generates the SPAD event or count graph of FIG. 10B including a first peak 1004 in bins that correspond to the first sensed distance $D_{TOF1}$ and a second peak 1006 in bins that correspond to the second sensed distance $D_{TOF2}$ that is equal to approximately twice the first sensed distance.

The smooth highly reflective surface of the mirror 103 results in a large count and thus a large signal amplitude SA associated with the first sensed distance $D_{TOF1}$ since most of the transmitted optical pulse signals 106 reflect off the mirror 103 as return optical pulse signals 108 that are received by the return SPAD array 312 (FIG. 3) of the TOF ranging sensor 104. The mirror scatters less light from the TOF than other types of surfaces that are less reflective. In this situation, the delay detection and processing circuit 314 (FIG. 3) of the TOF ranging sensor 104 utilizes this sensed information including the distances $D_{TOF1}$ and $D_{TOF2}$ and signal amplitudes SA of the object 103 and object 105 to determine that the object 103, which is a mirror in the example of FIG. 9A, is an object having a high reflectance surface. More specifically, where the TOF ranging sensor 104 senses a first object 103 at a first distance $D_{TOF1}$ and a second object at a second distance $D_{TOF2}$ equal to approximately twice the first distance, and the first object has a large sensed signal amplitude SA, the delay detection and processing circuit 314 (FIG. 3) determines that the sensed object 103 is an object having a high reflectance surface such a mirror. The delay detection and processing circuit 314 then sets the confidence value CV in the range estimation signal RE to indicate detection of such a high reflectance surface. In this situation, as previously described with reference to FIG. 8, the autofocusing control circuitry 102 then focuses the image capture device 100 based on conventional autofocusing techniques.

Figure 11:
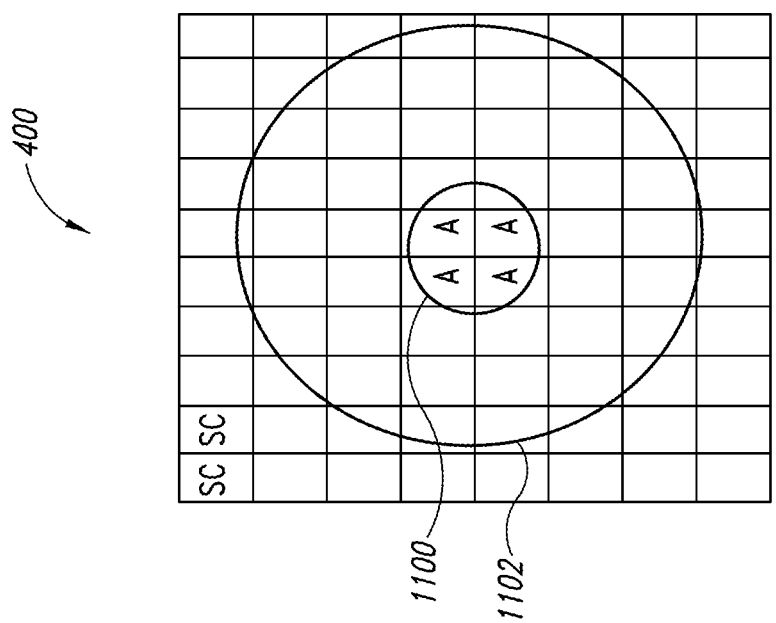
FIG. 11 is a diagram illustrating the more focused or concentrated nature of return optical pulse signals reflected off of a highly reflective surface and incident upon the return SPAD array of FIG. 4A compared to return optical pulse signals reflected off a non-highly reflective surface.

FIG. 11 is a diagram illustrating the more focused or concentrated nature of return optical pulse signals reflected off of a highly reflective surface and incident upon the return SPAD array 400 of FIG. 4A compared to return optical pulse signals that reflect off an object not having a highly reflective surface. A first circle 1100 represents return optical pulse signals 108 that have reflected off of an object having a highly reflective surface such as glass or a mirror. A second circle 1102 represents return optical pulse signals 108 that have reflected off an object that does not have a highly reflective surface, such as a person or a wall. As seen in the figure, the first circle 1100 shows that the return optical pulse signals 108 are incident upon a relatively small number SPAD cells SC in the return SPAD array 400, with these SPAD cells includes "A" to indicate active. Conversely, the second circle 1102 shows that the return optical pulse signals 108 reflecting off of an object not having a highly reflective surface are more diffuse or scattered and thus are incident upon a larger number of SPAD cells SC in the return SPAD array 400.

Figure 12:
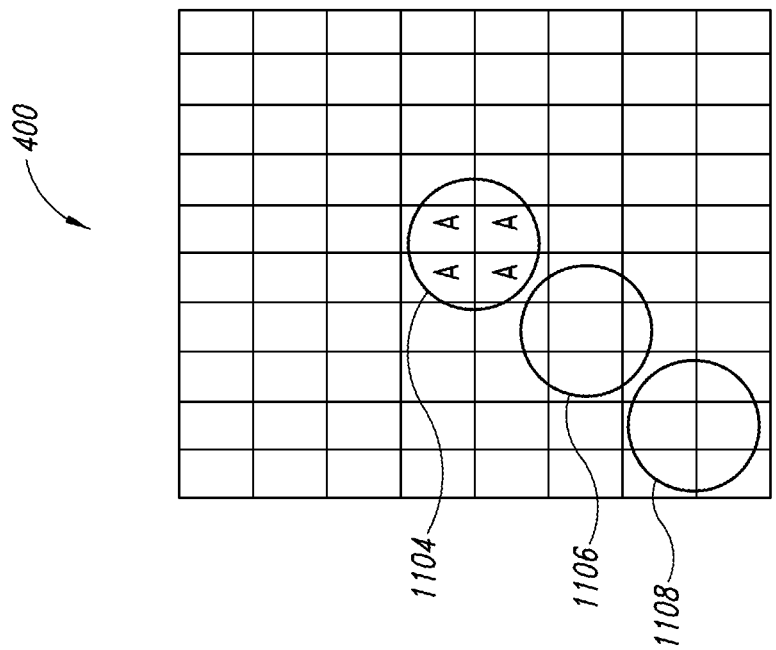
FIG. 12 is a diagram illustrating movement over time of return optical pulse signals reflected off of a highly reflective surface and incident on the return SPAD array of FIG. 4A due to relative movement of the image capture device and the highly reflective surface.
Figure 13:
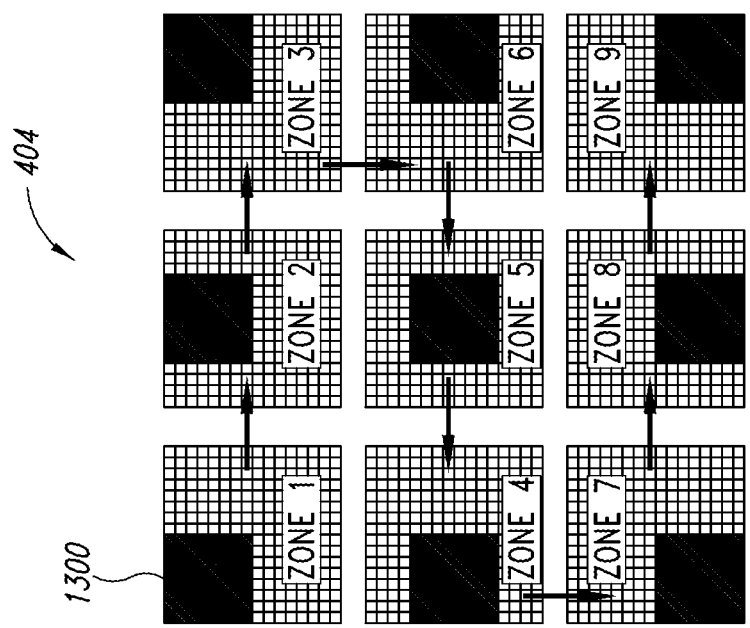
FIG. 13 is a diagram illustrating movement over time of return optical pulse signals off of a highly reflective surface and incident on the multiple zone return SPAD array of FIG. 4B due to relative movement of the image capture device and the highly reflective surface.

FIG. 12 is a diagram illustrating movement over time of return optical pulse signals 108 reflected off of a highly reflective surface and incident on the return SPAD array 400 of FIG. 4A due to relative movement of the image capture device 100 and the object 103 having the highly reflective surface. The circles 1104, 1106 and 1108 represent return optical pulse signals 108 that have reflected off a highly reflective surface at progressive points in time. Thus, the relative movement of the image capture device 100 and the highly reflective surface results in movement of the activated SPAD cells SC in the return SPAD array 400 over time. FIG. 13 is a diagram illustrating how the multiple zone return SPAD array 404 of FIG. 4B can be utilized to detect the movement of FIG. 12. The return SPAD array 404 of FIG. 13 includes nine array zones ZONE1-ZONE9 and arrows in FIG. 13 illustrate movement of a square 1300, which represents return optical pulse signals 108 that have reflected off of an object having a highly reflective surface such as glass or a mirror, from zone-to-zone in the multiple zone return SPAD array. The zones ZONE1-ZONE9 are shown separated from one another in FIG. 13 so that the arrows indicating movement of the square 1300 from one zone to another could be more easily illustrated.

In the example of FIG. 13, the delay detection and processing circuit 314 (FIG. 3) of the TOF ranging sensor 104 utilizes this information regarding the movement of the sensed object at sensed distance $D_{TOF1}$ from zone-to-zone among the array zones ZONE1-ZONE9. The detection of such a condition indicates the sensed object 103 at the distance $D_{TOF1}$ is likely an object having a highly reflective surface. Thus, when the TOF ranging sensor 104 senses a first object 103 at a first distance $D_{TOF1}$ and the first object has a large sensed signal amplitude SA, and the sensed object moves from zone-to-zone among array zones ZONE1-ZONE9 of the multiple zone return SPAD array 404, the delay detection and processing circuit 314 (FIG. 3) determines that the sensed object 103 is an object having a high reflectance surface such a mirror. The delay detection and processing circuit 314 then sets the confidence value CV in the range estimation signal RE to indicate detection of such a high reflectance surface. In this situation, as previously described with reference to FIG. 8, the autofocusing control circuitry 102 then focuses the image capture device 100 based on conventional autofocusing techniques.

While in the present disclosure embodiments are described including a ranging device including SPAD arrays, the principles of the circuits and methods described herein for calculating a distance to an object could be applied to arrays formed of other types of photon detection devices.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not to be limited to the embodiments of the present disclosure.

The invention claimed is:

1. A device, comprising:
a time-of-flight ranging sensor configured to transmit optical pulse signals and to receive return optical pulse signals, the time-of-flight ranging sensor configured to process the return optical pulse signals to sense distances to a plurality of objects and configured to process the return optical pulse signals to generate a reflectivity confidence value indicating whether one of the plurality of objects has a highly reflective surface, and the time-of-flight sensor further configured to generate a range estimation signal including a plurality of sensed distances and the reflectivity confidence value; and
autofocusing circuitry coupled to the time-of-flight sensor to receive the range estimation signal and configured to control focusing based upon the sensed distances responsive to the reflectivity confidence value indicating none of the plurality of objects has a highly reflective surface and configured to control focusing independent of the sensed distances responsive to the reflectivity confidence value indicating one of the objects has a highly reflective surface, wherein:
the time-of-flight ranging sensor is further configured to generate the range estimation signal including for each of the plurality of sensed objects a signal amplitude based upon a number of photons of the return optical pulse signals received by the time-of-flight sensor for the object;
the time-of-flight ranging sensor is further configured to generate the reflectivity confidence value based upon the generated signal amplitudes;
the time-of-flight ranging sensor comprises a return array of light sensors that detect the return optical pulse signals, the return array including a plurality of array zones, each array zone of the return array being configured to receive return optical pulse signals from a corresponding one of a plurality of spatial zones of a receiving field of view of the time-of-flight ranging sensor; and
the time-of-flight ranging sensor is configured to generate the reflectivity confidence value indicating detection of an object having a highly reflective surface based upon sensing that the object has a high signal amplitude, relative to an expected signal amplitude for a person, in a concentrated number of array zones.

2. The device of claim 1, wherein the autofocusing circuitry is configured to control focusing based upon contrast detection autofocusing or phase detection autofocusing in response to the reflectivity confidence value indicating one of the objects has a highly reflective surface.

3. The device of claim 1, wherein the second distance is equal to approximately twice the first distance.

4. The device of claim 1, wherein the time-of-flight ranging sensor is further configured to generate the reflectivity confidence value indicating detection of an object having a highly reflective surface based upon sensing movement over time of the concentrated number of array zones among the array zones of the return array.

5. The device of claim 1, wherein the time-of-flight ranging sensor is further configured to generate the reflectivity confidence value indicating no object having a highly reflective surface has been detected based upon sensing an object having a low signal amplitude in multiple array zones.

6. The device of claim 1, wherein the return array comprises an array of single photon avalanche diodes.

7. A method, comprising:
sensing a first distance to a first object and a second distance to a second object with a time-of-flight sensor, the sensing including transmitting optical pulse signals and receiving return optical pulse signals;
determining whether the first object has a high reflectance surface based upon the return optical pulse signals; and
focusing on the second object if the determination indicates the first object has a high reflectance surface by adjusting an autofocus system of a camera associated with the time-of-flight sensor, wherein:
the sensing includes the time-of-flight ranging sensor determining signal amplitudes based upon a number of photons of the return optical pulse signals received by the time-of-flight sensor for the first and second objects;
the determining includes determining whether the first object has a high reflectance surface based upon the generated signal amplitudes;
the time-of-flight ranging sensor comprises a return array of light sensors that detect the return optical pulse signals, the return array including a plurality of array zones, each array zone of the return array being configured to receive return optical pulse signals from a corresponding one of a plurality of spatial zones of a receiving field of view of the time-of-flight ranging sensor; and
the determining includes determining whether the first object has a high reflectance surface based upon sensing that the first object has a high signal amplitude, relative to an expected signal amplitude for a person, in a concentrated number of array zones.

8. The method of claim 7, wherein determining whether the first object having a high reflectance surface comprises determining whether the first object is glass.

9. The method of claim 7, wherein determining whether the first object has a high reflectance surface comprises determining whether the first object is a mirror.

10. The method of claim 7, wherein focusing on the second object if the determination indicates the first object has a high reflectance surface comprises adjusting the autofocus system of the camera based on the second distance.

11. The method of claim 7, wherein focusing on the second object if the determination indicates the first object has a high reflectance surface comprises adjusting the autofocus system of the camera based on contrast detection autofocusing or phase detection autofocusing.

12. A device, comprising:
a time-of-flight ranging sensor that in operation senses a first object and a second object in a field of view and generates a range estimation signal including detected distances to each of the first and second objects, signal amplitudes of each of the first and second objects, and a reflectivity confidence value indicating whether the first object has a high reflectance surface;
an image sensor;
an autofocusing subsystem coupled to the image sensor;
autofocusing control circuitry coupled to the time-of-flight ranging sensor and the autofocusing subsystem, the autofocusing control circuitry in operation generates a second object autofocusing control signal in response to the reflectivity confidence value indicating the first object has a high reflectance surface, wherein:
the time-of-flight ranging sensor is further configured to generate the range estimation signal including for each of the first and second objects respective signal amplitudes based upon a number of photons of the return optical pulse signals received by the time-of-flight sensor for the first and second objects;
the time-of-flight ranging sensor is further configured to generate the reflectivity confidence value based upon the generated signal amplitudes;
the time-of-flight ranging sensor comprises a return array of light sensors that detect the return optical pulse signals, the return array including a plurality of array zones, each array zone of the return array being configured to receive return optical pulse signals from a corresponding one of a plurality of spatial zones of a receiving field of view of the time-of-flight ranging sensor; and
the time-of-flight ranging sensor is configured to generate the reflectivity confidence value indicating detection of the first object having a highly reflective surface based upon sensing that the first object has a high signal amplitude, relative to an expected signal amplitude for a person, based upon the number of array zones that sense the first object.

13. The device of claim 12 further comprising processing circuitry coupled to the image sensor, the processing circuitry in operation controls the image sensor in response to the second object autofocusing control signal.

14. The device of claim 13, wherein the time-of-flight ranging sensor comprises:
a light source that in operation transmits an optical pulse signal; and
a reference array of light sensors that in operation sense transmission of the optical pulse signal;
wherein the return array of light sensors, in operation, receives the return optical pulse signals corresponding to portions of the transmitted optical pulse signal that reflect off objects in the field of view.

15. The device of claim 12, wherein the time-of-flight ranging sensor further in operation determines whether the first object has a high reflectance surface based upon changes over time of the array zones sensing the first object.

16. The device of claim 15, wherein the processing circuitry comprises one of smart phone and tablet computer circuitry.

* * * * *